(12) United States Patent
Wong

(10) Patent No.: US 11,867,392 B1
(45) Date of Patent: Jan. 9, 2024

(54) COMBUSTOR WITH TANGENTIAL FUEL AND AIR FLOW

(71) Applicant: Pratt & Whitney Canada Corp., Longueuil (CA)

(72) Inventor: Owen Wong, Markham (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/105,001

(22) Filed: Feb. 2, 2023

(51) Int. Cl.
| | |
|---|---|
| *F23D 14/24* | (2006.01) |
| *F23R 3/28* | (2006.01) |
| *F02C 9/40* | (2006.01) |
| *F02C 7/22* | (2006.01) |
| *F23R 3/00* | (2006.01) |

(52) U.S. Cl.
CPC .............. *F23D 14/24* (2013.01); *F23R 3/283* (2013.01); *F02C 7/22* (2013.01); *F02C 9/40* (2013.01); *F05D 2220/32* (2013.01); *F05D 2240/35* (2013.01); *F05D 2240/36* (2013.01); *F23R 3/002* (2013.01); *F23R 3/286* (2013.01)

(58) Field of Classification Search
CPC .......... F23D 14/24; F23R 3/283; F23R 3/002; F23R 3/286; F02C 7/22; F02C 9/40; F05D 2220/32; F05D 2240/35; F05D 2240/36
See application file for complete search history.

(56) References Cited

U.S. PATENT DOCUMENTS

| | | | |
|---|---|---|---|
| 5,231,833 A | 8/1993 | MacLean et al. | |
| 5,653,109 A | 8/1997 | Overton et al. | |
| 5,882,184 A * | 3/1999 | Feldermann | F23D 14/24 431/9 |
| 7,832,212 B2 | 11/2010 | Bunker | |
| 7,870,736 B2 | 1/2011 | Homitz et al. | |
| 8,266,911 B2 | 9/2012 | Evulet | |
| 8,413,445 B2 | 4/2013 | Poyyapakkam | |
| 8,539,773 B2 | 9/2013 | Ziminsky et al. | |
| 8,661,779 B2 | 3/2014 | Aster et al. | |
| 8,893,500 B2 | 11/2014 | Oskam | |
| 9,771,869 B2 | 9/2017 | Li et al. | |
| 9,976,522 B2 | 5/2018 | Patel et al. | |

(Continued)

FOREIGN PATENT DOCUMENTS

| | | |
|---|---|---|
| CN | 101220955 | 7/2008 |
| CN | 206113000 | 4/2017 |

(Continued)

*Primary Examiner* — Gerald L Sung
*Assistant Examiner* — Rene D Ford
(74) *Attorney, Agent, or Firm* — Carlson, Gaskey & Olds, P.C.

(57) ABSTRACT

A combustor includes a liner defining a combustion chamber, and receiving an air and fuel mixing body. The mixing body includes a forward face facing into the combustion chamber. A plurality of circumferentially spaced columns about a central axis of the combustor each have at least two fuel supply passages and two air supply passages extending to the forward face. At least one of the two air supply passages and one of the fuel supply passages extending along a direction with a circumferentially extending component in a first circumferential direction. The other of the two air supply passages and the fuel supply passages extend with a circumferential component in a second opposed circumferential direction. A gas turbine engine is also disclosed.

20 Claims, 3 Drawing Sheets

(56) References Cited

U.S. PATENT DOCUMENTS

| | | |
|---|---|---|
| 10,060,625 B2 * | 8/2018 | Abe .................. F23R 3/346 |
| 10,082,294 B2 | 9/2018 | Laster et al. |
| 10,267,522 B2 | 4/2019 | Ciani et al. |
| 10,502,425 B2 | 12/2019 | Boardman et al. |
| 10,704,786 B2 | 7/2020 | Laster et al. |
| 10,865,989 B2 | 12/2020 | Sadasivuni |
| 10,941,940 B2 | 3/2021 | Bulat et al. |
| 11,067,280 B2 | 7/2021 | Boardman et al. |
| 11,131,458 B2 | 9/2021 | Prociw et al. |
| 2011/0185703 A1 | 8/2011 | Dodo et al. |
| 2012/0227411 A1 | 9/2012 | Carroni et al. |
| 2014/0007582 A1 * | 1/2014 | Abe .................. F02C 7/26 60/738 |
| 2016/0008830 A1 * | 1/2016 | Yamamoto ........... B05B 7/0876 431/285 |
| 2016/0040883 A1 * | 2/2016 | Asai .................. F23R 3/10 60/737 |
| 2017/0074519 A1 * | 3/2017 | Abe .................. F23R 3/10 |
| 2017/0227224 A1 | 8/2017 | Oskam et al. |
| 2017/0254264 A1 * | 9/2017 | Schimek ............. F23R 3/14 |
| 2017/0284671 A1 * | 10/2017 | Asai .................. F23R 3/36 |
| 2017/0307210 A1 | 10/2017 | Hirano et al. |
| 2020/0240326 A1 * | 7/2020 | Miura ............... F23R 3/286 |
| 2021/0172413 A1 | 6/2021 | Snyder |
| 2022/0228741 A1 * | 7/2022 | Jeong ................ F23R 3/14 |
| 2023/0167976 A1 * | 6/2023 | Karishuku ........... F23R 3/343 60/739 |

FOREIGN PATENT DOCUMENTS

| | | |
|---|---|---|
| EP | 1923637 | 5/2008 |
| JP | 2013108667 | 6/2013 |
| JP | 5538113 | 7/2014 |
| JP | 5926635 | 5/2016 |
| WO | 2016051756 | 4/2016 |
| WO | 2018/212760 A1 | 11/2018 |
| WO | 2020259919 | 12/2020 |

* cited by examiner

COMBUSTOR WITH TANGENTIAL FUEL AND AIR FLOW

BACKGROUND

This application relates to a combustor having fuel and air mixing structure delivering air and fuel into a combustion chamber with improved mixing.

Gas turbine engines are known, and typically include a compressor delivering compressed air into a combustor. Compressed air is mixed with fuel and ignited. Products of the combustion pass downstream over turbine rotors, driving them to rotate. The turbine rotors in turn rotate a compressor rotor and a propulsor rotor such as a fan or propeller.

Historically, aviation fuel has been utilized with gas turbine engines, especially for aircraft applications. More recently it has been proposed to utilize hydrogen ($H_2$) as a fuel.

SUMMARY

A combustor includes a liner defining a combustion chamber, and receiving an air and fuel mixing body. The mixing body includes a forward face facing into the combustion chamber. A plurality of circumferentially spaced columns about a central axis of the combustor each have at least two fuel supply passages and two air supply passages extending to the forward face. At least one of the two air supply passages and one of the fuel supply passages extending along a direction with a circumferentially extending component in a first circumferential direction. The other of the two air supply passages and the fuel supply passages extend with a circumferential component in a second opposed circumferential direction.

These and other features will be best understood from the following drawings and specification, the following is a brief description.

DETAILED DESCRIPTION

Figure 1:
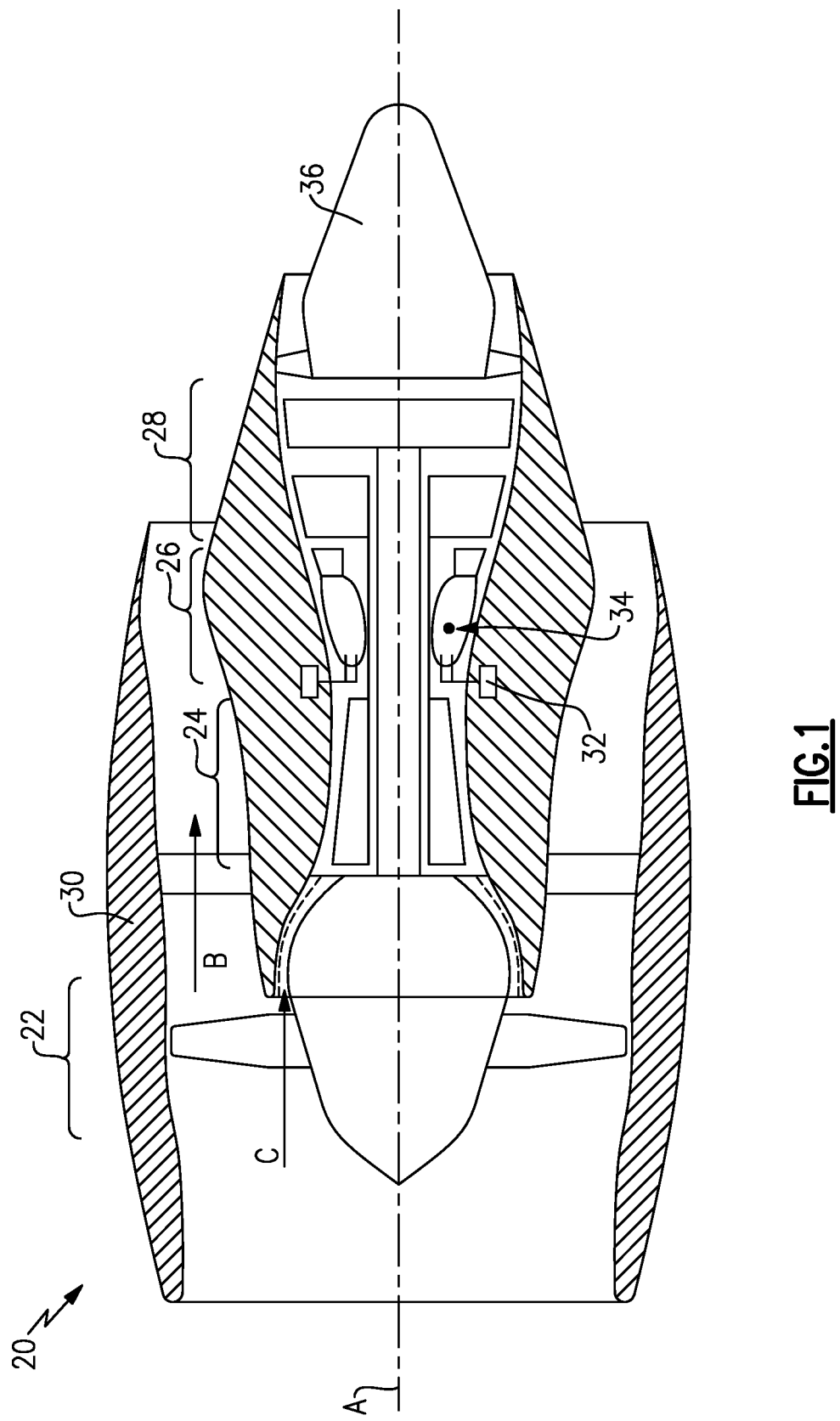
FIG. 1 schematically shows a gas turbine engine.

FIG. 1 schematically illustrates a gas turbine engine 20. The example gas turbine engine 20 is a turbofan that generally incorporates a fan section 22, a compressor section 24, a combustor section 26 and a turbine section 28. The fan section 22 drives air along a bypass flow path B in a bypass duct defined within a nacelle 30. The turbine engine 20 intakes air along a core flow path C into the compressor section 24 for compression and communication into the combustor section 26. In the combustor section 26, the compressed air is mixed with fuel from a fuel system 32 and ignited by igniter 34 to generate an exhaust gas flow that expands through the turbine section 28 and is exhausted through exhaust nozzle 36. Although depicted as a turbofan turbine engine in the disclosed non-limiting embodiment, it should be understood that the concepts described herein are not limited to use with turbofans as the teachings may be applied to other types of turbine engines. As one example, rather than having the propulsor be an enclosed fan, the propulsor may be an open propeller. This embodiment can also be applied to industrial gas turbine engine as well.

A gas turbine engine as disclosed in this application will utilize hydrogen ($H_2$) as a fuel. Challenges are faced by the use of hydrogen, and in particular combustor structure which might be appropriate for aviation fuel may not be as applicable to hydrogen as a fuel.

One challenge when utilizing hydrogen as a fuel is that it is in a gaseous state inside the combustor and more readily flammable than liquid aviation fuel. This could raise challenges with flashback if the local flame speed is higher than the fuel-air mixture inlet speed into the combustor.

Figure 2:
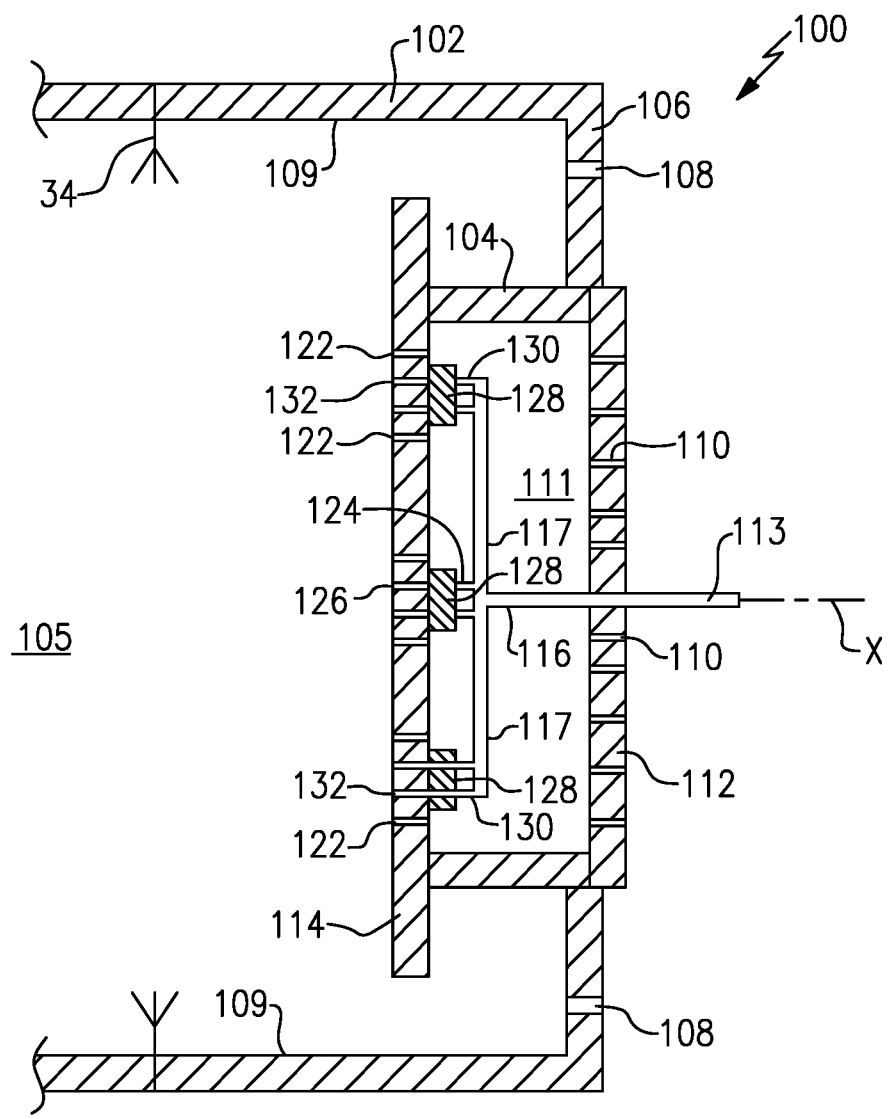
FIG. 2 shows an embodiment of a combustor.

FIG. 2 shows a combustor 100 having a liner 102, shown partially. Ignitors 34 are mounted in the liner 102. The liner 102 defines an internal combustion chamber 105. A backwall 106 mounts a fuel and air mixing body 104. Inner surfaces 109 of the liner 102 receive starter film airflow through openings 108 extending through the backwall 106 of the liner 102.

A plurality of air inlets 110 extend into a central chamber 111, and then through a forward wall 114 having air openings 122, and into the combustor chamber 105.

A central fuel supply 113 also extends through rear face 112 of the mixing body 104. This central fuel supply 113 defines a central axis X for the fuel supply passages to be described.

The fuel supply 113 extends to a plurality of radially extending passages 117. Passages 117 communicate with passages 130, to extend into extending openings 132, which allow fuel flow into the combustion chamber 105.

Central extending passages 124 extend from the radially extending passages 117, and through a cellular body 128, and lead to outlet passages 126 through the forward face 114. In practice, some outer housing would surround the cellular material such that fuel cannot leak outwardly of the body 128.

The size of the passages 117 heading radially inwardly and radially outwardly can be chosen in combination with the size of passages 124 to control the volume of fuel directed to the three sets of fuel openings. In particular, a designer would like to control the volume of products of combustion as they approach a vane at the downstream end of the combustor. Thus, in a reverse flow combustor it may be desirable to have a lesser amount of fuel directed to the radially outward location, with more fuel directed to the radially inward location and central location. To achieve this the passage 117 heading radially outwardly would be made to be smaller in diameter than the passage 117 heading radially inwardly. Conversely, in an axial flow combustor the opposite may be desirable.

Notably, a cellular material, such as a metal foam, may be positioned in body 128 intermediate the passages 130 and openings 132 and passages 124 and openings 126. Embodiments of metal foam may be formed of Inconel®. Other example materials could be cellular metallic material (CMM). The use of the cellular material in body 128 provides a flame arrestor function to avoid flashback of the flame toward the fuel supply. Although not show body 128 and fuel passages 130 are such that fuel flows within the cellular material and to the openings.

Figure 3A:
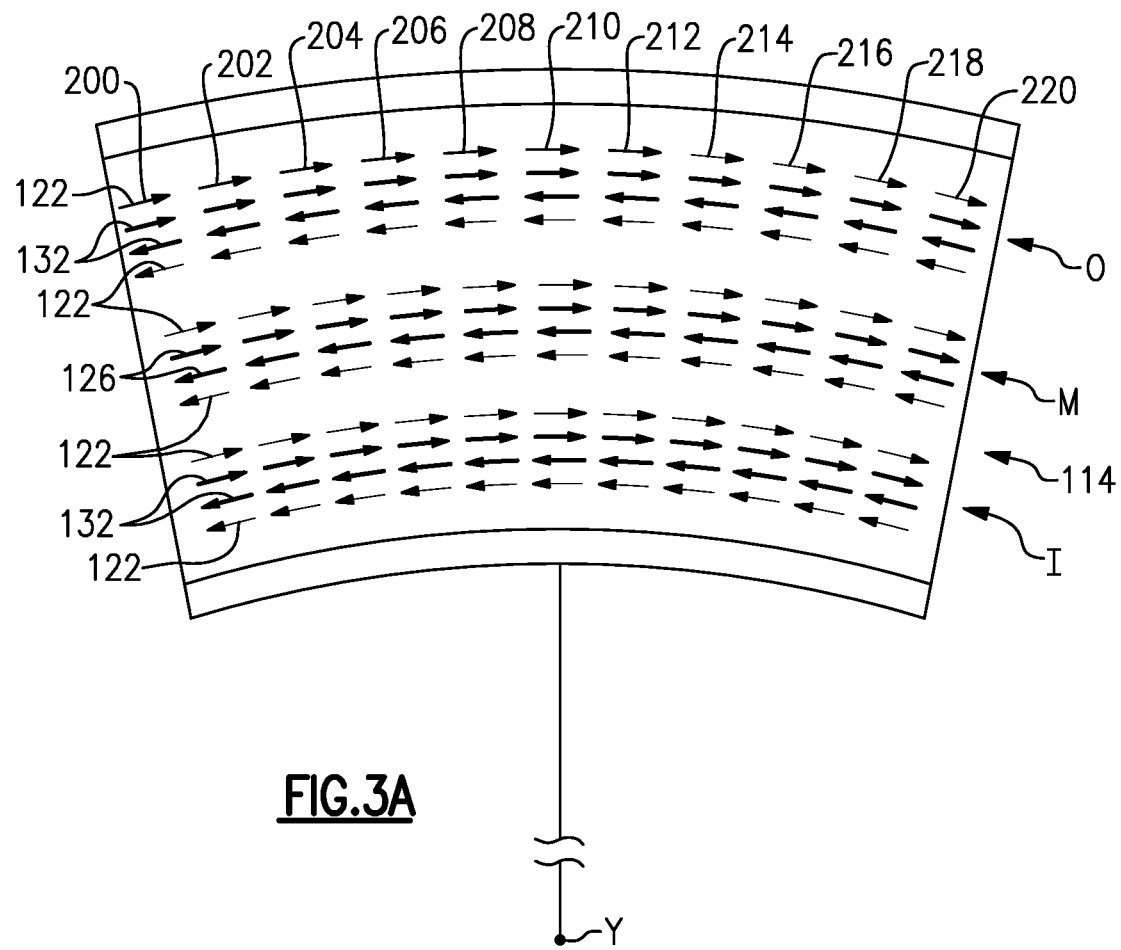
FIG. 3A shows an internal view of fluid flow within a combustion chamber from that mixing body of FIG. 2.

As shown in FIG. 3A, the fuel openings 132 and 126 are radially intermediate outer air passages 122. There are air openings 122 on each radial side of the fuel openings 132.

As such, there is effectively an outer mixing set O a middle mixing set M and inner mixing set I. Of course there can be more sets.

The fluid flow from all of the passages is essentially tangential to a central axis Y of the combustor, and an associated gas turbine engine. As shown, radially outer pairs of air and fuel supply passages in each of the outer, middle and inner sets extend in distinct circumferential directions. The outermost paired air and fuel supply passages in each of the sections flow in one circumferential direction and the inner paired ones flow in an opposed circumferential direction. The flow direction will create vortices to improve mixing of fuel and air. In addition, by injecting the fuel in a circumferential direction the hot gasses can be controlled to remain closer to the middle of the combustor instead of moving closer to the walls.

There are four rows of associated passages in each of the sections, and a plurality of circumferential spaced columns 200, 202, 204, 206, 208, 210, 212, 214, 216, 218 and 220. The tangential flow and the distinct circumferential directions of the several passages will ensure good mixing of the fuel downstream of the forward face 114. The cellular material found in sections 128 decrease the likelihood of flame back from the combustion chamber 105 back into the fuel supply passages.

Figure 3B:
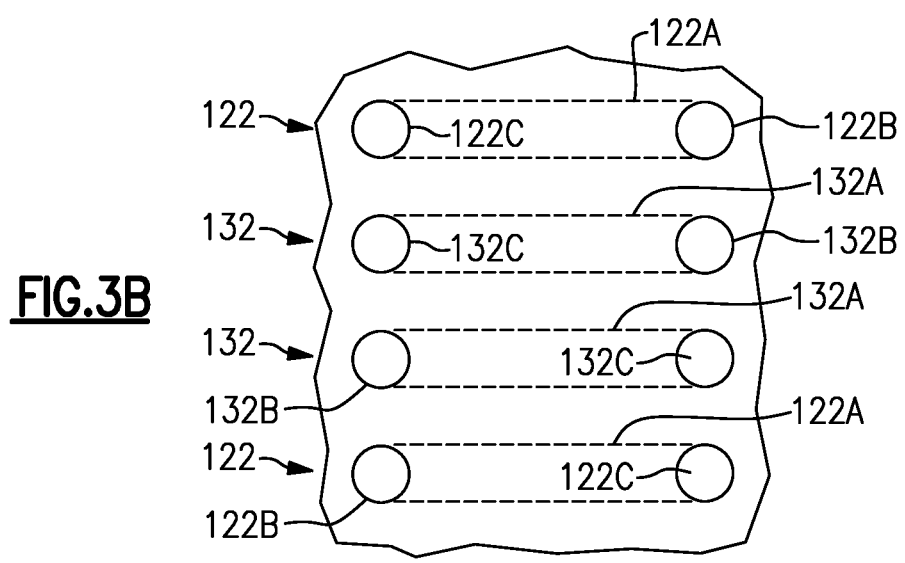
FIG. 3B shows structural features to achieve the flow illustrated in FIG. 3A.

FIG. 3B shows a feature of the passages 122 and 132. While illustrated as extending parallel to axis X in FIG. 2, in fact, to achieve the tangential and circumferential flow of FIG. 3A the passages extend at an angle to the forward face 114. Thus, passages 132A are angled from an inlet 132C to an outlet 132B. Similarly, the air is delivered through angled passages section 122A from an inlet 122C to an outlet 122B. This achieves the alternative clockwise flow illustrated in FIG. 3A.

Stated another way, each of the air supply passages and the fuel supply passages extend away from a passage inlet to a passage outlet with a component in their respective circumferential directions.

Notably, for purposes of this application the term "radially" should not be interpreted to mean directly radially. Instead, it is intended to make clear the passages extend along a direction with a component in a radial direction.

Effectively, the forward face 114 provides a heat shield protecting the rear wall 106. The hot side of the forward face 118 may be coated with a ceramic-based thermal barrier coating. The air holes 110 provide cooling air to the forward face 114 to cool it prior to entering the combustor.

In a featured embodiment, a combustor 100 includes a liner 102 defining a combustion chamber, and receiving an air and fuel mixing body 104. The mixing body includes a forward face 114 facing into the combustion chamber and there is a plurality of circumferentially spaced columns 200/220 about a central axis Y of the combustor. At least two fuel supply passages 124/130 and two air supply passages 122 extend through the forward face, with at least one of the at least two air supply passages and one of the at least two fuel supply passages extending along a direction with a circumferentially extending component in a first circumferential direction. The other of the at least two air supply passages and the at least two fuel supply passages extend with a circumferential component in a second opposed circumferential direction.

In another embodiment according to the previous embodiment, there are at least three sets of the at least two fuel supply passages and the at least two air supply passages, with the at least three sets O, M, I being spaced radially relative to the of the central axis of the combustor.

In another embodiment according to any of the previous embodiments, a fuel supply 113 supplies fuel to the at least two fuel supply passages, and the fuel supply is hydrogen.

In another embodiment according to any of the previous embodiments, a chamber with a cellular material 128 is positioned intermediate the fuel supply and the at least two fuel supply passages.

In another embodiment according to any of the previous embodiments, the forward face 114 has a ceramic-based thermal barrier coating on a hot side.

In another embodiment according to any of the previous embodiments, the liner has a rear wall 112 and starter air supply passages 108 extend through the rear wall radially outwardly of the mixing body.

In another embodiment according to any of the previous embodiments, a plurality of rear air inlets 110 extends through the rear wall and to the at least two air passages in the forward face.

In another embodiment according to any of the previous embodiments, each of the at least two air supply passages and the at least two fuel supply passages extend away from a passage inlet to a passage outlet with a component in their respective circumferential directions.

In another embodiment according to any of the previous embodiments, there is a central fuel supply 113 delivering fuel into at least one radially extending passage 117 extending to inner and outer ones of the sets, and extending fuel passages 130 extend from the at least one radially extending passage to the at least two fuel passages, and at each of the columns.

In another embodiment according to any of the previous embodiments, there is a central fuel supply 113 delivering fuel into at least one radially extending passage 117 extending to inner and outer ones of the sets, and extending fuel passages 130 extend from the at least one radially extending passage to the at least two fuel passages, and at each of the columns.

A gas turbine engine incorporating any of the above features is also disclosed and claimed.

Although embodiments have been disclosed, a worker of skill in this art would recognize that modifications would come within the scope of this disclosure. For that reason, the following claims should be studied to determine the true scope and content of this disclosure.

What is claimed is:

1. A combustor comprising:
   a liner defining a combustion chamber, and receiving an air and fuel mixing body; and
   the mixing body including a forward face facing into the combustion chamber and a plurality of circumferentially spaced columns of supply passages about a central axis of the combustor, the supply passages comprising at least two fuel supply passages and at least two air supply passages extending to said forward face in each of said columns, with at least one of said at least two air supply passages and one of said at least two fuel supply passages extending along a direction with a circumferentially extending component in a first circumferential direction, and an other of said at least two air supply passages and an other of said at least two fuel supply passages extending with a circumferential component in a second opposed circumferential direction.

2. The combustor as set forth in claim 1, wherein there are at least three sets of said at least two fuel supply passages and said at least two air supply passages, with said at least three sets being spaced radially relative to the central axis of the combustor.

3. The combustor as set forth in claim 1, wherein a fuel supply supplies fuel to said at least two fuel supply passages, and the fuel supply is hydrogen.

4. The combustor as set forth in claim 3, wherein a chamber with a cellular material is positioned intermediate the fuel supply and the at least two fuel supply passages.

5. The combustor as set forth in claim 1, wherein the forward face has a ceramic-based thermal barrier coating on a hot side.

6. The combustor as set forth in claim 1, wherein the liner has a rear wall and starter air supply passages extend through said rear wall radially outwardly of the mixing body.

7. The combustor as set forth in claim 6, wherein a plurality of rear air inlets extends through the rear wall and to the at least two air passages in the forward face.

8. The combustor as set forth in claim 2, wherein each of the at least two air supply passages and said at least two fuel supply passages extend away from a passage inlet to a passage outlet with a component in the respective circumferential directions.

9. The combustor as set forth in claim 8, wherein the at least three sets includes an inner set and an outer set, and wherein there is a central fuel supply delivering fuel into at least one radially extending passage extending to the inner set and outer set, and extending fuel passages extend from the at least one radially extending passage to the at least two fuel passages at each of the columns.

10. The combustor as set forth in claim 2, wherein the at least three sets includes an inner set and an outer set, and wherein there is a central fuel supply delivering fuel into at least one radially extending passage extending to the inner set and the outer set, and extending fuel passages extend from the at least one radially extending passage to the at least two fuel passages at each of the columns.

11. A gas turbine engine comprising:
a compressor section and a turbine section with an intermediate combustor;
the combustor having a liner defining a combustion chamber, the liner receiving an air and fuel mixing body; and
the mixing body including a forward face facing into the combustion chamber and a plurality of circumferentially spaced columns of supply passages about a central axis of the combustor, the supply passages comprising at least two fuel supply passages and at least two air supply passages extending to said forward face in each of said columns, with at least one of said at least two air supply passages and one of said at least two fuel supply passages extending along a direction with a circumferentially extending component in a first circumferential direction, and an other of said at least two air supply passages and an other of said at least two fuel supply passages extending with a circumferential component in a second opposed circumferential direction.

12. The gas turbine engine as set forth in claim 11, wherein there are at least three sets of said at least two fuel supply passages and said at least two air supply passages, with said at least three sets being spaced radially relative to the central axis of the combustor.

13. The gas turbine engine as set forth in claim 11, wherein a fuel supply supplies fuel to said at least two fuel supply passages, and the fuel supply is hydrogen.

14. The gas turbine engine as set forth in claim 13, wherein a chamber with a cellular material is positioned intermediate the fuel supply and the at least two fuel supply passages.

15. The gas turbine engine as set forth in claim 11, wherein the forward face has a ceramic-based thermal barrier coating on a hot side.

16. The gas turbine engine as set forth in claim 11, wherein the liner has a rear wall and starter air supply passages extend through said rear wall radially outwardly of the mixing body.

17. The gas turbine engine as set forth in claim 16, wherein a plurality of rear air inlets extends through the rear wall and to the at least two air passages in the forward face.

18. The gas turbine engine as set forth in claim 12, wherein each of the at least two air supply passages and said at least two fuel supply passages extend away from a passage inlet to a passage outlet with a component in the respective circumferential directions.

19. The gas turbine engine as set forth in claim 18, wherein the at least three sets includes an inner set and an outer set, and wherein there is a central fuel supply delivering fuel into at least one radially extending passage extending to the inner set and outer set, and extending fuel passages extend from the at least one radially extending passage to the at least two fuel passages at each of the columns.

20. The gas turbine engine as set forth in claim 12, wherein the at least three sets includes an inner set and an outer set, and wherein there is a central fuel supply delivering fuel into at least one radially extending passage extending to the inner set and the outer set, and extending fuel passages extend from the at least one radially extending passage to the at least two fuel passages at each of the columns.

* * * * *